United States Patent
Tani et al.

(10) Patent No.: US 8,025,600 B2
(45) Date of Patent: Sep. 27, 2011

(54) ENDLESS BELT FOR POWER TRANSMISSION

(75) Inventors: Hirofumi Tani, Seto (JP); Hiroyuki Yamaguchi, Seto (JP); Yuji Hattori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 484 days.

(21) Appl. No.: 12/282,291

(22) PCT Filed: Nov. 7, 2007

(86) PCT No.: PCT/JP2007/071648
§ 371 (c)(1),
(2), (4) Date: Sep. 9, 2008

(87) PCT Pub. No.: WO2008/056706
PCT Pub. Date: May 15, 2008

(65) Prior Publication Data
US 2009/0054189 A1 Feb. 26, 2009

(30) Foreign Application Priority Data
Nov. 7, 2006 (JP) ................................ 2006-301957

(51) Int. Cl.
*F16G 1/28* (2006.01)
(52) U.S. Cl. ........................................ 474/249; 474/265
(58) Field of Classification Search ............ 474/249, 474/265, 272, 246, 244, 242, 240, 237
See application file for complete search history.

(56) References Cited

U.S. PATENT DOCUMENTS

| 5,011,461 A | * | 4/1991 | Brouwers | ...................... 474/188 |
| 6,045,474 A | * | 4/2000 | Smeets et al. | .................. 474/249 |
| 6,086,499 A | * | 7/2000 | Brandsma | ...................... 474/201 |
| 2009/0280940 A1 | * | 11/2009 | Toyohara et al. | ............. 474/242 |

FOREIGN PATENT DOCUMENTS

| GB | 1 549 403 A | 8/1979 |
| JP | A-02-236045 | 9/1990 |
| JP | A-10-213185 | 8/1998 |
| JP | A-2002-295596 | 10/2002 |

OTHER PUBLICATIONS

Mar. 4, 2011 Office Action issued in German Patent Application No. 11 2007 002 641.3-12 (with translation).

* cited by examiner

*Primary Examiner* — Michael Mansen
*Assistant Examiner* — Juan Campos, Jr.
(74) *Attorney, Agent, or Firm* — Oliff & Berridge, PLC

(57) ABSTRACT

An endless belt for power transmission is capable of efficiently improving the yawing attitude of the elements in a variable pulley. This endless belt for power transmission includes the elements and an annular band-like member for supporting the elements. The endless belt is winched between a pair of variable pulleys. Groove parts extending from the front surface of the belt in the forward movement direction to a predetermined position not reaching to the rear surface of the belt in the forward movement direction are formed in the side surfaces of the elements contacting with the belt sliding surfaces of the variable pulleys.

5 Claims, 6 Drawing Sheets

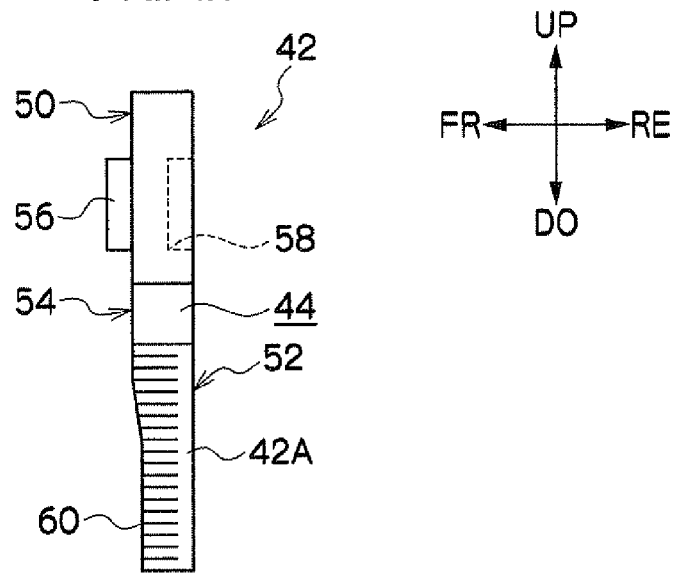
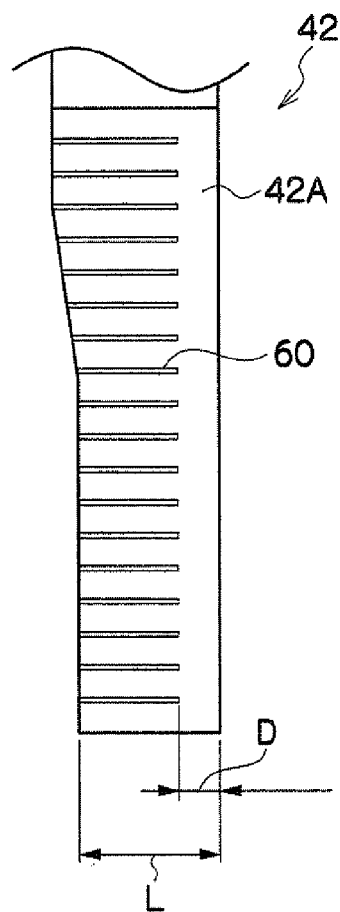

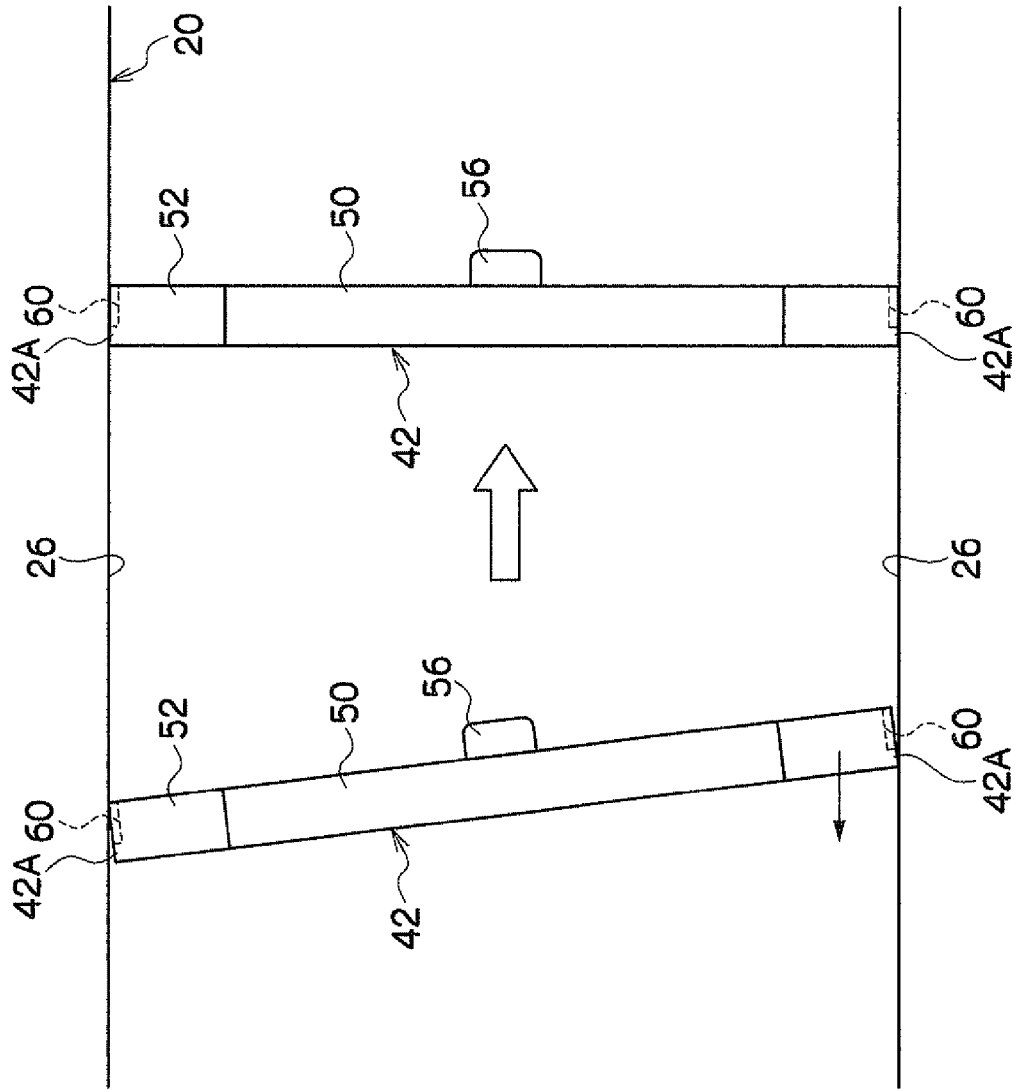
FIG. 5
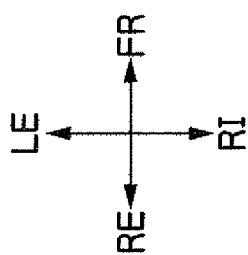

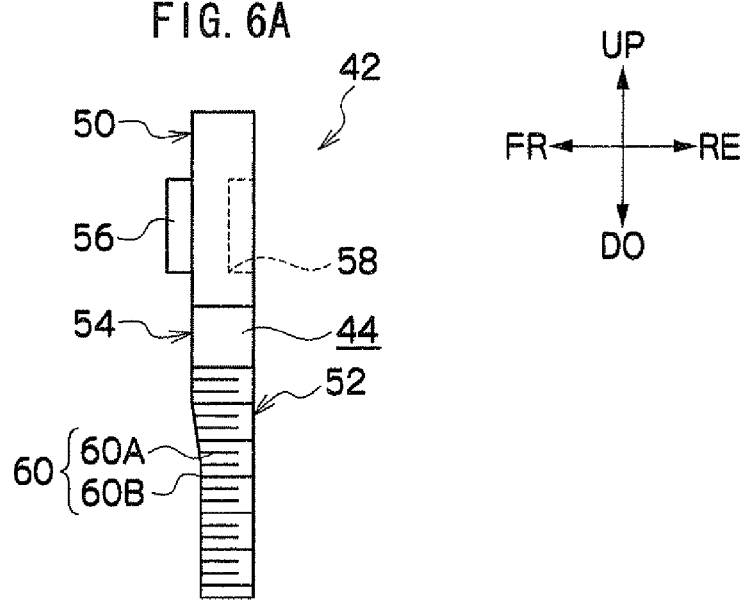
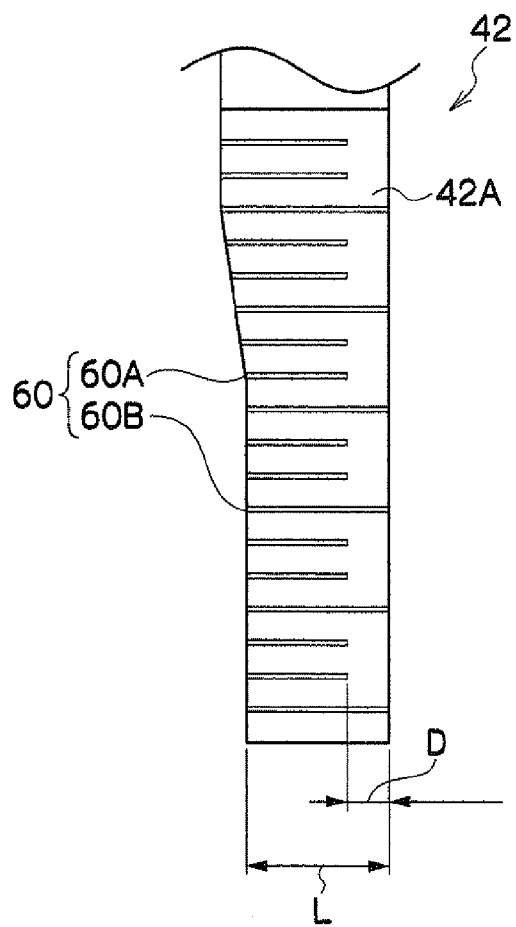

ENDLESS BELT FOR POWER TRANSMISSION

TECHNICAL FIELD

The present invention relates to an endless belt for the power transmission, in which a plurality of elements are supported by a looped band-shaped member, which endless belt is wound around a pair of variable pulleys.

BACKGROUND ART

In an endless belt for the power transmission in which a plurality of elements are supported by a looped band-shaped member, which belt is wound around a pair of variable pulleys, these elements each comprise a main body section that undergoes pinching pressure from the pair of variable pulleys, and a head section connected to the main body section via a neck section. A plurality of groove sections provided to facilitate removal of an oil film are formed on a side surface (flank surface) of the main body portion, which surface comes into contact with a belt sliding surface of the variable pulley (for example, refer to patent document 1 or patent document 2).

The main kinds of behavioral deterioration of the element are deterioration of yawing motion and deterioration of pitching behavior. Deterioration of the yawing motion, for example, partial hitting of the side surface (flank surface) of the element against the belt sliding surface of the variable pulley, has a great impact on transmission of a torque. Usually, at the entrance of the variable pulleys (at the upstream side of a belt traveling direction), in the case of the element having a deteriorated yawing motion, the yawing motion of the element is improved in such a manner that in a transition region of an idle arc (a region in which no compression force acts in between the elements) and an active arc (a region in which compression force acts in between the elements) in the variable pulley, a rear surface side of a preceding side surface (flank surface) of the element in the belt traveling direction slides against the variable pulley.

However, in the case of the element described in patent document 1, a groove portion provided to facilitate removal of an oil film is formed on the side surface (flank surface) of the element in a straight manner from the front surface to the rear surface of the element in the belt traveling direction. For this reason, the yawing motion of the element deteriorates at the entrance of the variable pulley, and even if the side surface (flank surface) of the element partially comes into contact with the belt sliding surface of the variable pulley, the action of removing an oil film by means of the groove portion does not change, and frictional force between the element and the variable pulley does not vary. In other words, when the element partially comes into contact with the belt sliding surface, it does not readily slide on the belt sliding surface, and thus, the element as above does not have an effective shape from the standpoint of improvement in the yawing motion thereof in the variable pulley.

In the element described in patent document 2, the intervals of groove portions provided to facilitate removal of an oil film are set, on the side surface (flank surface) of the element, such that distances between adjacent groove portions at the front surface side of the element in the belt traveling direction are wider and those at the rear surface side of the element in the belt traveling direction are narrower. For this reason, the yawing motion of the element deteriorates at the entrance of the variable pulley, and when the front surface side and rear surface side of the side surface (flank surface) of the element in the belt traveling direction each partially come into contact with the belt sliding surface, increase of surface pressure caused by a decrease of an area coming into contact with the variable pulley becomes an issue at the front surface side of the element in the belt traveling direction. Further, at the rear surface side in the belt traveling direction, increase of the area coming into contact with the variable pulley produces an effect of reducing a surface pressure, but the action of removing an oil film does not change, whereby reduction of frictional force between the element and the variable pulley cannot be expected. In other words, when this element partially comes into contact with the belt sliding surface, it also does not readily slide on the belt sliding surface, and therefore, the element does not have an effective shape from the standpoint of improvement in the yawing motion in the variable pulleys.

Patent document 1. Japanese Patent Application Laid-Open (JP-A) No. 2-236045
Patent document 2: Japanese Patent Application Laid-Open (JP-A) No. 10-213185

DISCLOSURE OF THE INVENTION

Problems to be Solved by the Invention

In view of the aforementioned circumstances, it is an object of the present invention to provide an endless belt for the power transmission that allows a yawing motion of an element to be efficiently improved in a variable pulley.

Means for Solving the Problems

In order to achieve the aforementioned problems, a first aspect of the present invention is an endless belt for power transmission, comprising a plurality of elements, and a looped band-shaped member that supports the plurality of elements, the endless belt being wound between a pair of variable pulleys, wherein a plurality of groove portions are formed at a side surface of each of the elements, the side surface contacting a belt sliding surface of the variable pulleys, and the groove portions each extend from a front surface of the elements in a belt traveling direction to a predetermined position short of a rear surface of the elements in the belt traveling direction.

According to the first aspect, the plurality of groove portions formed at the side surface of the elements is made to extend from the front surface of the elements in the belt traveling direction to a predetermined position that does not reach the rear surface of the elements in the belt traveling direction, and therefore, oil film interposed between the side surface of the elements and the belt sliding surface of the variable pulleys is not removed in a portion between the predetermined position and the rear surface in the belt traveling direction. Accordingly, in a case in which the elements partially come into contact with the belt sliding surface, it is readily slidable against the belt sliding surface. If the yawing motion of the elements deteriorates in the variable pulley, the yawing motion is efficiently improved.

Further, the second aspect of the present invention is an endless belt for power transmission, comprising a plurality of elements, and a looped band-shaped member that supports the plurality of elements, the endless belt being wound between a pair of variable pulleys, wherein a plurality of first groove portions and a plurality of second groove portions are formed and interspersed at a side surface of each of the elements, the side surface contacting a belt sliding surface of the variable pulleys, the first groove portions extend from a front surface of the elements in a belt traveling direction to a predetermined position short of a rear surface of the elements in the belt traveling direction, and the second groove portions extend from the front surface to the rear surface of the elements in the belt traveling direction.

According to the second aspect, the plurality of groove portions formed on the side surface of the elements include first groove portions each extending from the front surface of the elements in the belt traveling direction to a predetermined position that does not reach the rear surface of the elements in the belt traveling direction. For this reason, oil film interposed between the side surface of the elements and the belt sliding surface of the variable pulleys is hard to be removed from a portion between the predetermined position and the rear surface of the elements in the belt traveling direction. Accordingly, in the case in which the elements partially come into contact with the belt sliding surface, it is readily slidable against the belt sliding surface. Even if the yawing motion of the elements deteriorates in the variable pulleys, the yawing motion is efficiently improved.

Moreover, according to the third aspect of the present invention, in the endless belt for power transmission of the aforementioned second aspect, more of the first groove portions are formed than the second groove portions.

According to the third aspect, a region from which oil film is not removed is increased on the side surface of the elements. Therefore, in the case in which the elements partially come into contact with the belt sliding surface, the side surface can be made to readily slide against the belt sliding surface. Accordingly, the yawing motion of the elements can be efficiently improved in the variable pulleys.

Still further, according to the fourth aspect of the present invention, in the endless belt for power transmission of the aforementioned aspects, a distance from the predetermined position to the rear surface of the elements in the belt traveling direction on the side surface of the elements is set in the range of from 1/8 to 1/4 of the thickness of the elements.

According to the fourth aspect, in the case in which the elements partially come into contact with the belt sliding surface, the side surface of the elements can be reliably made to slide against the belt sliding surface. Accordingly, the yawing motion of the elements can be efficiently improved in the variable pulleys.

Effects of the Invention

As described above, the present invention can provide an endless belt for the power transmission that allows the yawing motion of the elements to be efficiently improved in the variably pulleys.

BRIEF DESCRIPTION OF THE DRAWINGS

FIG. 4A is a schematic side view of a belt block.

FIG. 4B is a schematic enlarged view of a flank surface.

FIG. 5 is an explanatory diagram showing the state in which yawing motion of a belt block is improved in the variable pulley.

FIG. 6A is a side view that schematically shows a modified example of a belt block.

FIG. 6B is a schematic enlarged view of the flank surface.

BEST MODE FOR CARRYING OUT THE INVENTION

Figure 1:
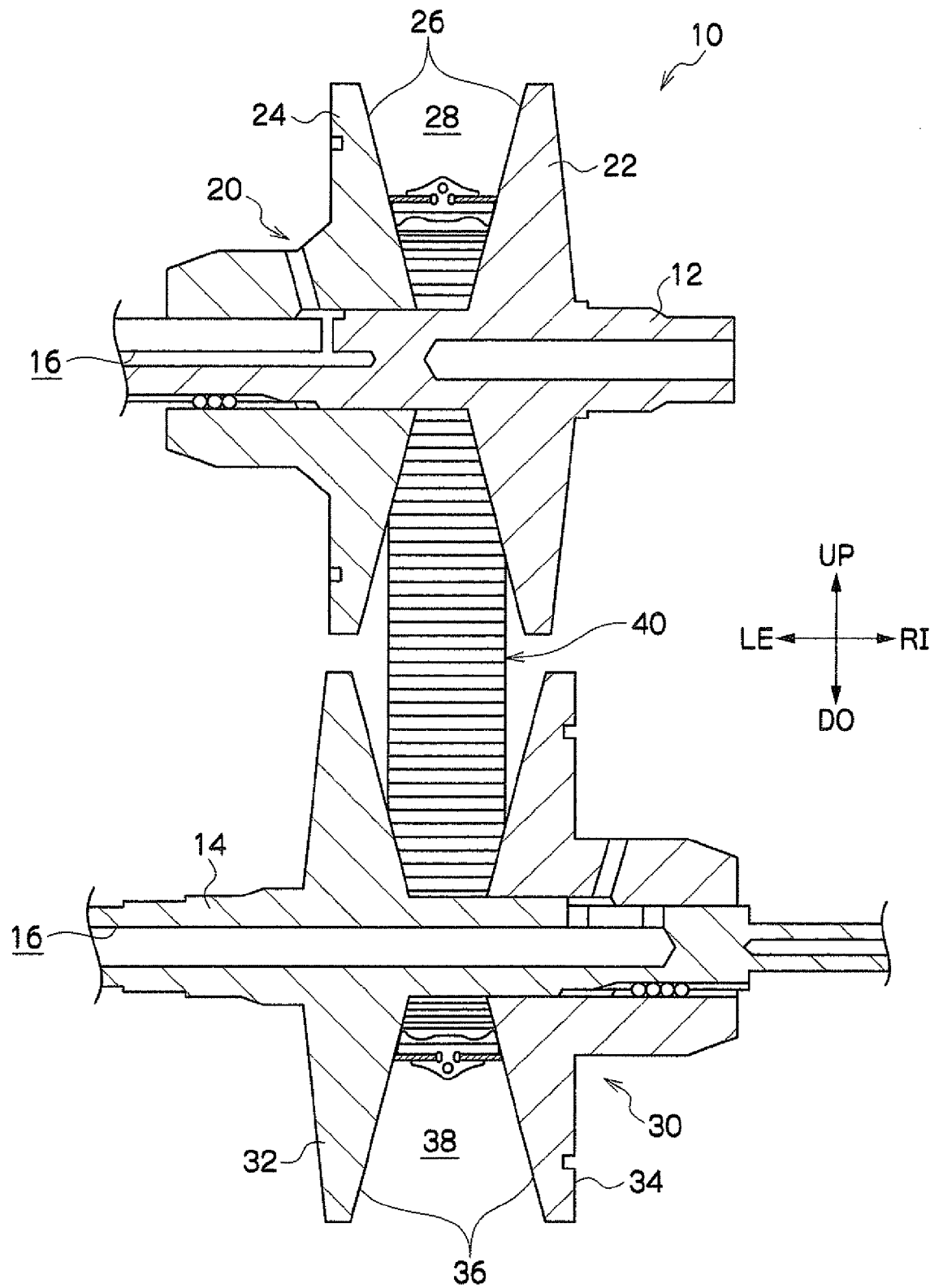
FIG. 1 is a front view that schematically shows the structure of a pair of variable pulleys in CVT.
Figure 2:
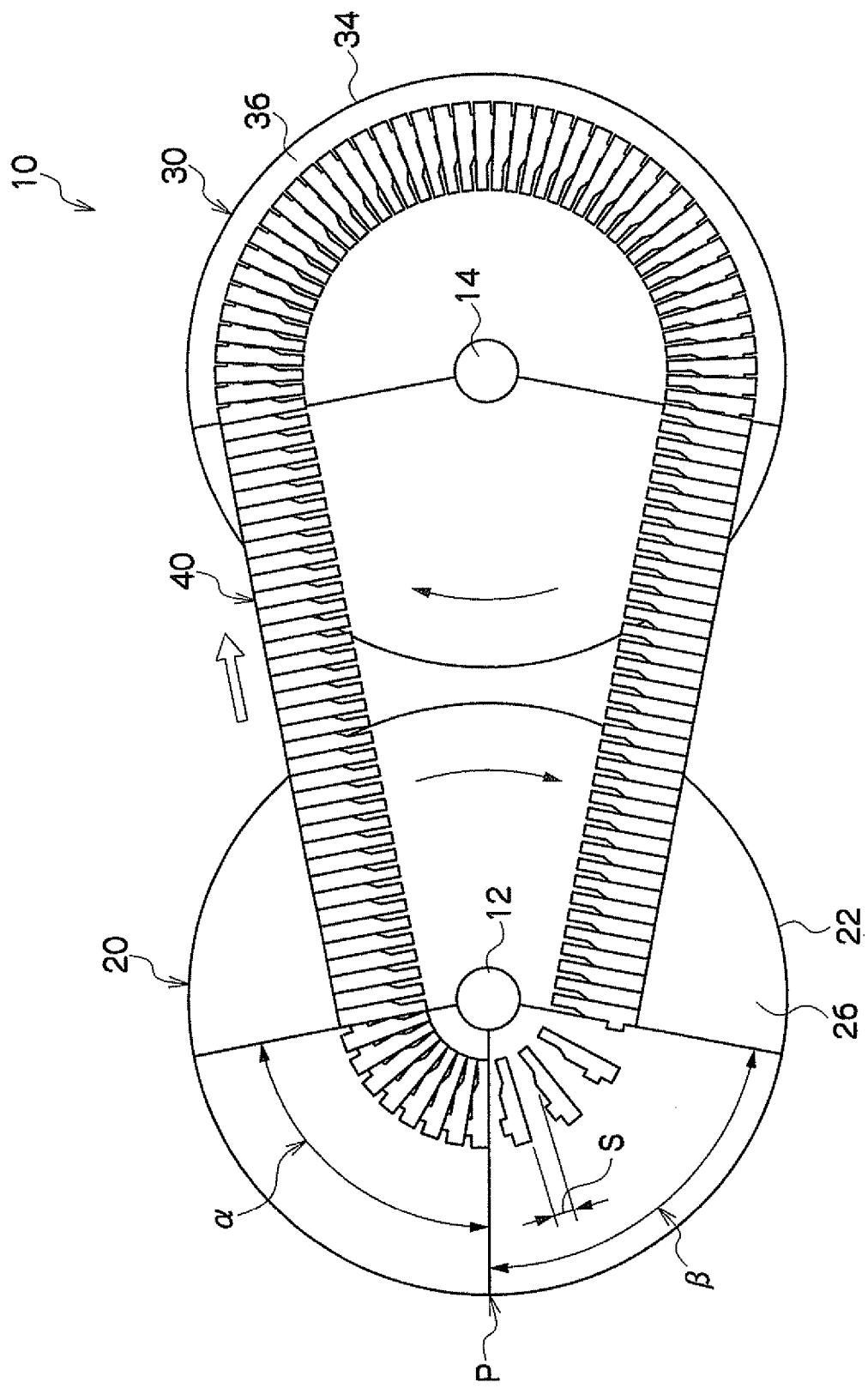
FIG. 2 is a side view that schematically shows the structure of a pair of variable pulleys in CVT.
Figure 3:
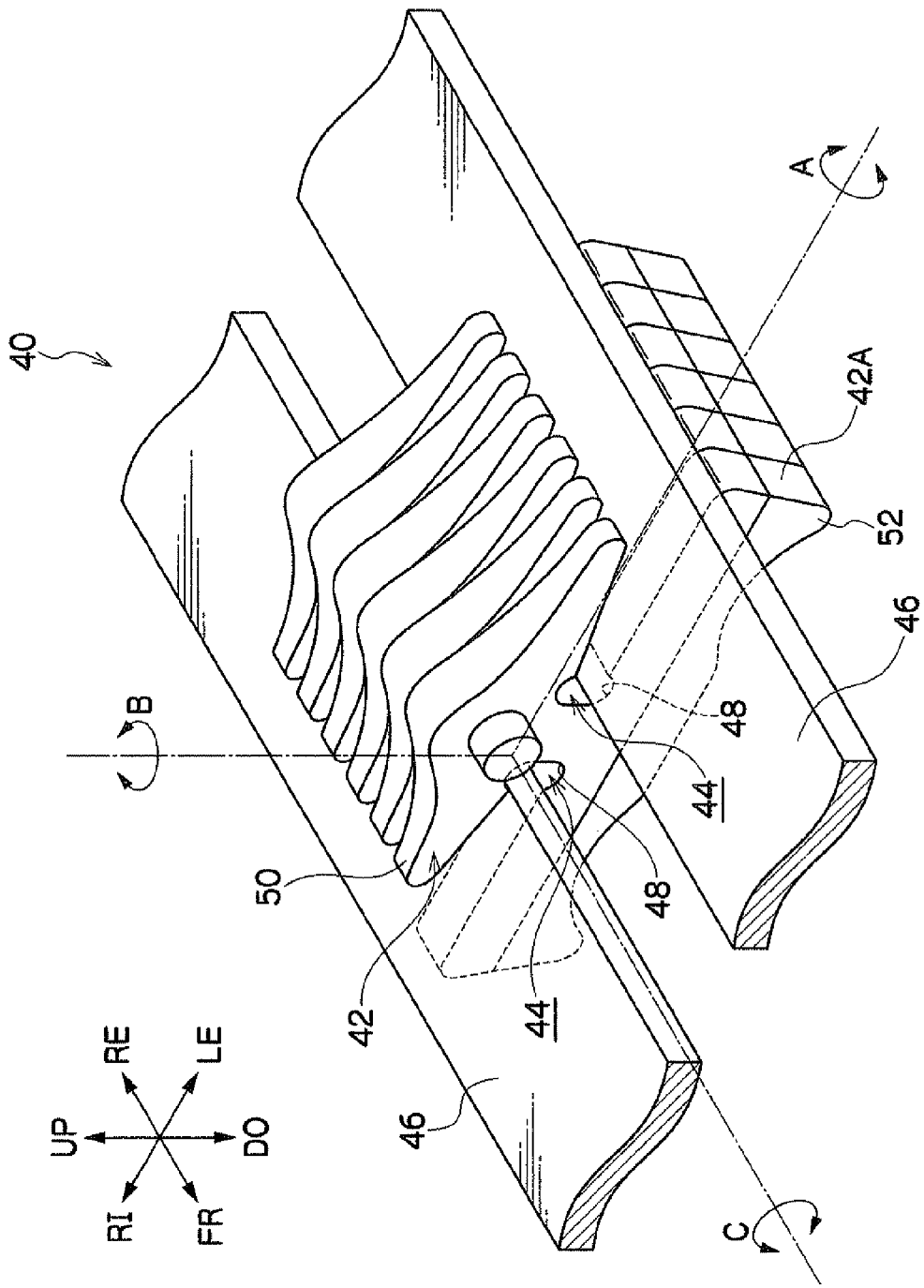
FIG. 3 is a perspective view that schematically shows the structure of an endless belt for the power transmission wound around the pair of variable pulleys.

Most preferred embodiments of the present invention will be hereinafter described in detail based on examples illustrated in the attached drawings. FIG. 1 is a front view that schematically shows the structure of a pair of variable pulleys (an input side variable pulley 20 and an output side variable pulley 30) in a belt type continuously variable transmission (hereinafter referred to as "CVT") for a vehicle, and FIG. 2 is the schematic side view of the structure. FIG. 3 is a perspective view that schematically shows the structure of an endless belt for power transmission (driving belt 40) wound around the pair of variable pulleys. It should be noted that, for convenience of explanation, arrow UP denotes an upward direction, arrow DO denotes a downward direction, arrow LE denotes a leftward direction, arrow RI denotes a rightward direction, arrow FR denotes a forward direction and arrow RE denotes a rearward direction.

As shown in FIGS. 1 and 2, the CVT 10 includes: an input shaft 12 that is rotatably supported by a housing (not shown) via a bearing (not shown); an output shaft 14 that is rotatably supported by a housing (not shown) via a bearing (not shown) so as to be parallel to the input shaft 12; an input side variable pulley 20 supported by the input shaft 12; an output side variable pulley 30 supported by the output shaft 14; and a driving belt 40 (an endless belt for power transmission) wound around the input side variable pulley 20 and the output shaft variable pulley 30.

The input shaft 12 is connected to a motor (not shown) via a torque converter or the like, and the output shaft 14 is operatively connected to a drive wheel (not shown) via reduction gears or a differential gear mechanism. The driving belt 40 allows rotating power to be transmitted from the input side variable pulley 20 to the output shaft variable pulley 30. That is to say, due to rotation of the input shaft 12, the input side variable pulley 20 is driven to rotate, and due to the output side variable pulley 30 being driven to rotate via the driving belt 40, the output shaft 14 is adapted to rotate.

The input side variable pulley 20 includes a fixed sheave 22 fixed to the input shaft 12 and formed in the shape of a disk-shaped fixed rotator, a movable sheave 24 that faces the fixed sheave 22 and cannot relatively rotate around the input shaft 12, which movable sheave 24 is formed as a disk-shaped movable rotator so as to be movable in the axial direction of the input shaft 12 (in the left-right direction), and a hydraulic actuator (not shown) provided in the input shaft 12 so as to impart thrust to the movable sheave 24.

Similarly, the output side variable pulley 30 includes a fixed sheave 32 fixed to the output shaft 14 and formed in the shape of a disk-shaped fixed rotator, a movable sheave 34 that faces the fixed sheave 32 and cannot relatively rotate around the output shaft 14, which movable sheave 34 is formed as a disk-shaped movable rotator so as to be movable in the axial direction of the output shaft 14 (in the left-right direction), and a hydraulic actuator (not shown) provided in the output shaft 14 so as to impart thrust to the movable sheave 34.

Further, in the input side variable pulley 20, the surfaces of the fixed sheave 22 and the movable sheave 24, which surfaces face each other, are respectively formed as a conically-shaped belt sliding surfaces 26 such that the space between these surfaces becomes wider from the rotational center (the input shaft 12) outward in the radial direction (toward the outer peripheral edge) of the input shaft. A V-groove 28 across which the driving belt 40 is racked is formed between the belt sliding surfaces 26.

Similarly, in the output side variable pulley 30, the surfaces of the fixed sheave 32 and the movable sheave 34, which surfaces face each other, are respectively formed as a conically-shaped belt sliding surfaces 36 such that the space between these surfaces becomes wider from the rotational center (the output shaft 14) outward in the radial direction (toward the outer peripheral edge) of the output shaft. A V-groove 38 across which the driving belt 40 is racked is formed between the belt sliding surfaces 36.

As shown in FIG. 3, the driving belt 40 is formed substantially in the shape of an anchor, and includes a large number of (a plurality of) thin plate-shaped belt blocks (elements) 42 which are arranged in the thickness-wise direction thereof (in the belt traveling direction), and a pair of endless hoops 46 (band-shaped members) that are disposed and engaged in engagement grooves formed at both sides of neck portions 54 (described later) of the belt blocks 42 in the widthwise direction thereof, so as to support the belt blocks 42.

The belt block 42 is made from metal (steel) from the viewpoint of the strength thereof. Further, the pair of hoops 46 is also made from metal. Thus, a metal ring assembly is formed in such a manner that a plurality of thin plate-shaped metal rings are laminated in layers. Formed respectively at the side of the movable sheave 24 of the input shaft 12 and at the side of the movable sheave 34 of the output shaft 14 are oil passages 16 where oil flows in and out.

In the CVT 10 having the aforementioned structure, when the movable sheave 24 and 34 move in the axial direction of these shafts (in the longitudinal direction thereof), the widthwise dimension of the V-groove 28 of the input side variable pulley 20 and the widthwise dimension of the V-groove 38 of the output side variable pulley 30 change, and thus, respective effective diameters of the input side variable pulley 20 and the output side variable pulley 30 (the rotation diameter of the driving belt 40) can be adjusted. In other words, the change gear ratio γ of the CVT 10 (γ=rotational speed of the input shaft 12/rotational speed of the output shaft 14) can be varied in a stepless manner (stepless speed change becomes possible).

Next, the belt blocks 42 (elements) according to the exemplary embodiment of the invention will be described in detail. FIG. 4A is a schematic side view of the belt block 42, and FIG. 4B is a schematic enlarged view of a side surface (hereinafter referred to as a "flank surface") 42A of the belt block 42.

As shown in FIG. 3, FIG. 4A and FIG. 4B, the belt block 42 includes a head section 50 formed substantially in the shape of an isosceles triangle when viewed from the front, a main body section 52 formed substantially in the shape of an isosceles trapezoid when seen from the front, and a neck section 54 that allows the head section 50 and the main body section 52 to be connected integrally at the left-right direction central portion thereof. The head section 50 and the main body section 52 extend in the left-right direction (in the widthwise direction thereof) by respective predetermined lengths. The extended length of the main body section 52 is longer than that of the head section 50 in the widthwise direction by a predetermined length, and thus, the head section 50 is adapted not to come into contact with the belt sliding surface 26 of the input side variable pulley 20 and the belt sliding surface 36 of the output side variable pulley 30.

Further, spaces formed at both sides of the neck section 54 in the left-right direction and also between the head section 50 and the main body section 52 are provided as engagement grooves 44, and notch portions 48 having a substantially circular configuration when viewed from the front are formed at either side of a connecting region between the neck section 54 and the head section 50 in the left-right direction and also at either side of a connecting region between the neck section 54 and the main body section 52 in the left-right direction. Due to the hoops 46 being inserted in the engagement grooves 44, the belt blocks 42 and the hoops 46 are adapted not to be separated from each other.

Moreover, a column-shaped projection (convex portion) is formed at the central portion on the front surface of the head section 50 so as to protrude a predetermined distance, and a circular recessed hole (concave portion) 58 is formed at the central portion on the rear surface of the head section 50 such that the depth of the hole is slightly longer than the protrusion distance of the projection 56 and the inner diameter of the hole is larger than the outer diameter of the projection 56. The belt blocks 42 are arranged adjacently in the belt traveling direction (in the longitudinal direction of the belt) in such a manner that the projection 56 of a subsequent belt block 42 is inserted in the hole 58 of a preceding belt block 42, whereby positioning of the belt blocks 42 is effected.

Further, as shown in FIGS. 4A and 4B, a plurality of (a large number of) groove portions 60 are formed on the flank surface 42A of the belt block 42 in parallel with the longitudinal direction of the belt (perpendicular to the front surface and the rear surface of the belt block). These groove portions 60 are provided to facilitate removal of an oil film of lubrication oil interposed between the belt sliding surfaces 26, 36 of the variable pulleys 20, 30, and the flank surface 42A of the belt block 42. In the belt block 42, these groove portions 60 are each formed so as to reach the front surface of the belt block 42 in the belt traveling direction, but so as not to reach the rear surface thereof in the belt traveling direction.

In other words, the plurality of (the large number of) groove portions 60 formed on the flank surface 42A of the belt block 42 are formed so as to extend on the flank surface 42A from the front surface of the belt block in the belt traveling direction to a predetermined position, which position does not reach the rear surface in the belt traveling direction. The width (distance) D of a portion of the belt block 42 in which no groove portion 60 is formed is set in the range of from ⅛ to ¼ of the thickness L of the belt block 42 at the side of the flank surface 42A. That is to say, the following expression is given.

$$D = L/8 \text{ to } L/4$$

Next, the operation of the belt block 42 (element) having the aforementioned structure will be described. As shown in FIG. 1 to FIG. 3, the plurality of (the large number of) belt blocks 42 are supported by the hoops 46, and are racked around and between the input side variable pulley 20 and the output side variable pulley 30. At this time, particularly at the belt straight-line region in which the driving belt 40 travels straightly, the belt blocks 42 arranged adjacently in the belt traveling direction (in the longitudinal direction of the belt) travels while projections 56 are being inserted in corresponding holes 58.

For example, as shown in FIG. 2, a winding angle of the driving belt 40 around the input side variable pulley 20 during transmission of torque is divided into a region α (an active arc) in which compression force acts between adjacent belt blocks 42, and a region β (an idle arc) in which no compression force acts between adjacent belt blocks 42. The belt blocks 42 arranged adjacently in the belt traveling direction make the transition from the idle arc β in the state in which clearances S are formed to the active arc α in the state in which the belt blocks are arranged close together with almost no clearance S formed therebetween (compression force acts thereon), in the transition region P, whereby the belt blocks 42 cause microslide with respect to the input side variable pulley 20.

At this time, as shown in FIG. 5, if the yawing motion of the belt blocks 42 (which yawing motion is indicated by arrow 13 in FIG. 3) deteriorates at the entrance of the input side variable pulley 20, in the aforementioned transition region P, the front surface at one preceding end (in the drawing, a right end portion) of the belt block 42 having a deteriorated yawing motion is relatively pushed by a preceding adjacent belt block 42, and therefore, the rear surface of the flank surface 42A at one preceding end portion (the right end portion) in the belt traveling direction moves to slide on the belt sliding surface 26 of the input side variable pulley 20. As a result, the yawing motion of the belt block 42 is improved.

Here, in a predetermined region on the flank surface 42A of the belt block 42 at the rear surface thereof in the belt traveling direction, no groove portion 60 is formed. Thus, as shown in FIG. 5, in the state in which the yawing motion of the belt block deteriorates and the flank surface 42A partially comes into contact with the belt sliding surface, the function of removing oil film at the rear surface of the flank surface 42A in the belt traveling direction is reduced. In other words, frictional force between the belt block 42 (flank surface 42A) and the input side variable pulley 20 (belt sliding surface 26) in the portion in which the belt block 42 partially comes into contact with the belt sliding surface decreases, and the flank surface 42A of the belt block 42 readily becomes slidable against the belt sliding surface 26 of the input side variable pulley 20. Accordingly, improvement of the yawing motion of the belt block 42 in the transition region P can be facilitated.

Particularly, the width (distance) D of the region in which no groove portion 60 is formed is set in the range from 1/8 to 1/4 of the thickness L of the belt block 42 in the portion of the flank surface 42A, and therefore, in a case in which the flank surface 42A of the belt block 42 partially comes into contact with the belt sliding surface 26 of the input side variable pulley 20, the flank surface 42A can be reliably made to slide against the belt sliding surface 26. In other words, if D is less than L/8, desired sliding cannot be achieved, but since D equals to L/8 or more, the yawing motion of the belt block 42 in the input side variable pulley 20 can be efficiently improved. Incidentally, if D is greater than L/4, a desired function of removing oil film cannot be obtained. Due to D being made equal to L/8 to L/4, desired sliding is obtained and the desired function of removing oil film is obtained.

Further, the front surface of the flank surface 42A in the belt traveling direction at the other end portion (in the drawing, the left end portion) of the belt block 42 having deteriorated yawing motion also partially comes into contact with the belt sliding surface 26 of the input side variable pulley 20. The portion of the belt block 42 that partially comes into contact with the belt sliding surface includes the groove portions 60 formed therein, so as to remove oil film. Hence, frictional force between the belt block 42 (flank surface 42A) and the input side variable pulley 20 (belt sliding surface 26) is held, so that the flank surface 42A of the belt block 42 is hard to slide against the belt sliding surface 26 of the input side variable pulley 20. Accordingly, when the yawing motion of the belt block 42 is improved, the partially contact portion acts as a rotational fulcrum, and improvement of the yawing motion of the belt block 42 is effected more smoothly.

Moreover, if the yawing motion of the belt block 42 is improved in the input side variable pulley 20, the flank surface 42A of the belt block 42 comes into contact with the belt sliding surface 26 of the input side variable pulley 20 across the entire surface thereof (inclusive of the groove portions 60 and the region having no groove portion 60 formed therein). At this time, the width (distance) D of the region having no groove portion 60 formed therein is set to be L/4 or less as mentioned above, and therefore, the oil film can be removed by the groove portions 60. Accordingly, in the active arc α of the input side variable pulley 20 to which power is transmitted from the driving belt 40, there is no need for concern about reduction in the frictional force between the flank surface 42A of the belt block 42 and the belt sliding surface 26 of the input variable pulley 20.

In other words, in the active arc α in which power is transmitted from the driving belt 40, if deterioration of the yawing motion of the belt block 42 can be restrained, the driving belt 40 can be wound around the input side variable pulley 20 at the proper attitude. Therefore, increase of torque capacity for belt power transmission, and advancement of transmission efficiency can be realized. In the belt block 42 according to the exemplary embodiment of the invention, which manifests such effects as mentioned above, it suffices that the groove portions 60 are only formed from the front surface of the flank surface 42A in the belt traveling direction to a predetermined position that does not reach the rear surface of the flank surface in the belt traveling direction. Thus, the belt block 42 as above has an advantage in that it can be simply formed.

Next, a description will be given of a modified example of the groove portions 60 to be formed in the flank surface 42A of the belt block 42. FIG. 6A is a schematic side view of a modified example of the belt block 42, and FIG. 6B is a schematic enlarged view of the flank surface 42A. As shown in FIGS. 6A and 6B, a plurality of (a large number of) groove portions 60 formed in the flank surface 42A of the belt block 42 may be structured so as to include first groove portions 60A each extending from the front surface of the belt block in the belt traveling direction to a predetermined position that does not reach the rear surface in the belt traveling direction, and second groove portions 60B each extending from the front surface to the rear surface of the belt block in the belt traveling direction, which are interspersed with each other. However, in this case, the number of the first groove portions 60A that do not reach the rear surface of the belt block in the belt traveling direction is preferably larger than that of the second groove portions 60B that extend up to the rear surface in the belt traveling direction.

Due to the aforementioned arrangement, the region in which oil film is not removed can be increased on the rear surface of the flank surface 42A in the belt traveling direction. For this reason, in a case in which the yawing motion of the belt block 42 deteriorates and the flank surface 42A partially comes into contact with the belt sliding surface 26 of the input side variable pulley 20, the flank surface 42A is made to readily slide against the belt sliding surface 26 like the above. That is to say, due to the aforementioned arrangement, the yawing motion of the belt block 42 can be improved efficiently in the input side variable pulley 20.

In the aforementioned modified example as well, it goes without saying that the width (distance) D of the region having no groove portion 60 formed therein is set in the range from 1/8 to 1/4 of the thickness L of the belt block 42 in the portion of the flank surface 42A. Further, the shape of the groove portions 60 to be formed on the flank surface 42A of the belt block 42 is not limited to those shown in FIG. 4A, FIG. 4B, FIG. 6A and FIG. 6B. For example, the groove portions may be formed so as to be made slanted with respect to the front surface (or rear surface) of the belt block at a predetermined angle. Further, Japanese Patent Application No. 2006-301957 is incorporated by reference herein in its entirety.

EXPLANATION OF REFERENCE NUMERALS

10 CVT (belt type continuously variable transmission)
12 input shaft
14 output shaft
20 input side variable pulley
22 fixed sheave
24 movable sheave
26 belt sliding surface
28 V-groove
30 output side variable pulley
32 fixed sheave
34 movable sheave
36 belt sliding surface
38 V-groove
40 driving belt (endless belt for power transmission)
42 belt block (element)
42A flank surface (side surface)
44 engagement groove
46 hoop (band-shaped member)
48 notch portion
50 head section
52 main body section
54 neck section
56 projection
58 hole
60 groove portions
60A first groove portion
60B second groove portion

What is claimed is:

1. An endless belt for power transmission having a pair of variable pulleys, comprising:
a plurality of elements;
a looped band-shaped member that supports the plurality of elements;
a plurality of groove portions formed at a side surface of each of the elements, wherein
the side surface contacting a belt sliding surface of the variable pulleys,
the plurality of groove portions each extend from a front surface of the elements in a belt traveling direction to a predetermined position short of a rear surface of the elements in the belt traveling direction, and
the plurality of groove portions are formed in parallel with the belt traveling direction.

2. An endless belt for power transmission having a pair of variable pulleys, comprising:
a plurality of elements;
a looped band-shaped member that supports the plurality of elements;
a plurality of first groove portions and a plurality of second groove portions formed and interspersed at a side surface of each of the elements, wherein
the side surface contacting a belt sliding surface of the variable pulleys,
the plurality of first groove portions extend from a front surface of the elements in a belt traveling direction to a predetermined position short of a rear surface of the elements in the belt traveling direction,
the plurality of second groove portions extend from the front surface to the rear surface of the elements in the belt traveling direction, and
the plurality of first groove portions and the plurality of second groove portions are formed in parallel with the belt traveling direction.

3. The endless belt for power transmission according to claim 2, wherein more of the first groove portions are formed than the second groove portions.

4. The endless belt for power transmission according to claim 1, wherein a distance from the predetermined position to the rear surface of the elements in the belt traveling direction at the side surface of the elements is set in the range of from 1/8 to 1/4 of the thickness of the elements.

5. The endless belt for power transmission according to claim 2, wherein a distance from the predetermined position to the rear surface of the elements in the belt traveling direction at the side surface of the elements is set in the range of from 1/8 to 1/4 of the thickness of the elements.

* * * * *